(12) United States Patent
Martin et al.

(10) Patent No.: US 7,043,478 B2
(45) Date of Patent: May 9, 2006

(54) ASYNCHRONOUS DATABASE UPDATES

(75) Inventors: Charles Martin, Montreal (CA); Dominique Herve, Montreal (CA)

(73) Assignee: Autodesk Canada Co., Montreal (CA)

( * ) Notice: Subject to any disclaimer, the term of this patent is extended or adjusted under 35 U.S.C. 154(b) by 622 days.

(21) Appl. No.: 09/928,154

(22) Filed: Aug. 10, 2001

(65) Prior Publication Data

US 2002/0156786 A1 Oct. 24, 2002

(30) Foreign Application Priority Data

Apr. 24, 2001 (GB) .................................. 0110008

(51) Int. Cl.
*G06F 7/00* (2006.01)
(52) U.S. Cl. ...................................... 707/10
(58) Field of Classification Search .................. 707/8, 707/100, 103 R, 203, 204; 709/204, 230; 711/133; 714/43
See application file for complete search history.

(56) References Cited

U.S. PATENT DOCUMENTS

| | | | |
|---|---|---|---|
| 5,404,488 A * | 4/1995 | Kerrigan et al. ............. | 711/133 |
| 5,623,659 A * | 4/1997 | Shi et al. ........................ | 707/8 |
| 5,751,958 A | 5/1998 | Zweben et al. | |
| 5,930,794 A * | 7/1999 | Linenbach et al. ......... | 707/100 |
| 6,446,077 B1 * | 9/2002 | Straube et al. .............. | 707/100 |

\* cited by examiner

*Primary Examiner*—Mohammad Ali
*Assistant Examiner*—E P LeRoux
(74) *Attorney, Agent, or Firm*—Gates & Cooper LLP

(57) ABSTRACT

An improved apparatus and method are provided for updating a database object. A database thread is implemented in a database-dependent application stored in the main memory of a computer. An object cache manager allows the database-dependent application to modify a cached version of a transient object and to queue corresponding database processing commands. The database thread updates the persistent data stored in the central database corresponding to the transient object. A Permit Manager provides for carrying out concurrency using a cache invalidation mechanism.

21 Claims, 11 Drawing Sheets

Figure 2 [PRIOR ART]

ASYNCHRONOUS DATABASE UPDATES

BACKGROUND OF THE INVENTION

1. Field of the Invention

The present invention relates to updating objects stored in a database, wherein a database thread manages database transaction requests, and said requests are processed with a lower priority than other, concurrent threads used to update said objects.

2. Description of the Related Art

The use of databases to store, correlate and distribute data is today well established. Databases are structured according to different operating principles and two of the most prominent thereof are relational databases and object-oriented databases. Typically, any of those different types of databases are stored in a central server connected to a network and the data stored therein is subsequently distributed for consultation, processing and updating to networked user terminals known to those skilled in the art as 'clients'. A client 'session' is thus initiated when a networked terminal user runs an application program or a database tool and connects to a relational- or object-oriented database stored in a remote database server.

In order to allow said client sessions to work "simultaneously" and share computer resources, said database server must control concurrency, i.e. the accessing of the same persistent data stored in said database by many users. Indeed, without adequate concurrency controls, a loss of data integrity is likely to occur. A relational or object-oriented database therefore uses locks to control concurrent access to data stored therein. In effect, a lock gives a networked terminal user temporary ownership of a database resource such as data or object stored in a database table, such that said data or object cannot be changed by other users until a user finishes working with it.

According to the prior art, a terminal user therefore consults persistent data which, upon being potentially amended by said terminal user, subsequently requires updating at the database server by means of a series of SQL statements known to those skilled in the art as a transaction. In this environment, a single multi-threaded multi-user database server handles all client database transaction requests by multiplexing a small number of threads from its thread pool.

A problem arises from the above prior art, which relates to the mechanism by which requests to update persistent data stored in the database are processed. Whilst said update takes place, i.e. SQL statements are processed at the database server, said terminal user cannot consult and potentially further amend or query said persistent data, thereby resulting in an unproductive lapse of time for said terminal user.

BRIEF SUMMARY OF THE INVENTION

It is an aim of the present invention to provide an improved apparatus for and method of updating a database object. A database thread is implemented in a database-dependent application stored in the main memory of a computer, such that an object cache manager allows said database-dependent application to modify a cached version of a transient object and to queue corresponding database processing commands, which will then be served by said database thread to update the persistent data stored in the central database corresponding to said transient object. A Permit Manager is implemented, such that concurrency is carried out by means of a cache invalidation mechanism.

BEST MODE FOR CARRYING OUT THE INVENTION

The invention will now be described by way of example only with reference to the previously identified drawings.

FIG. 1

Figure 1:
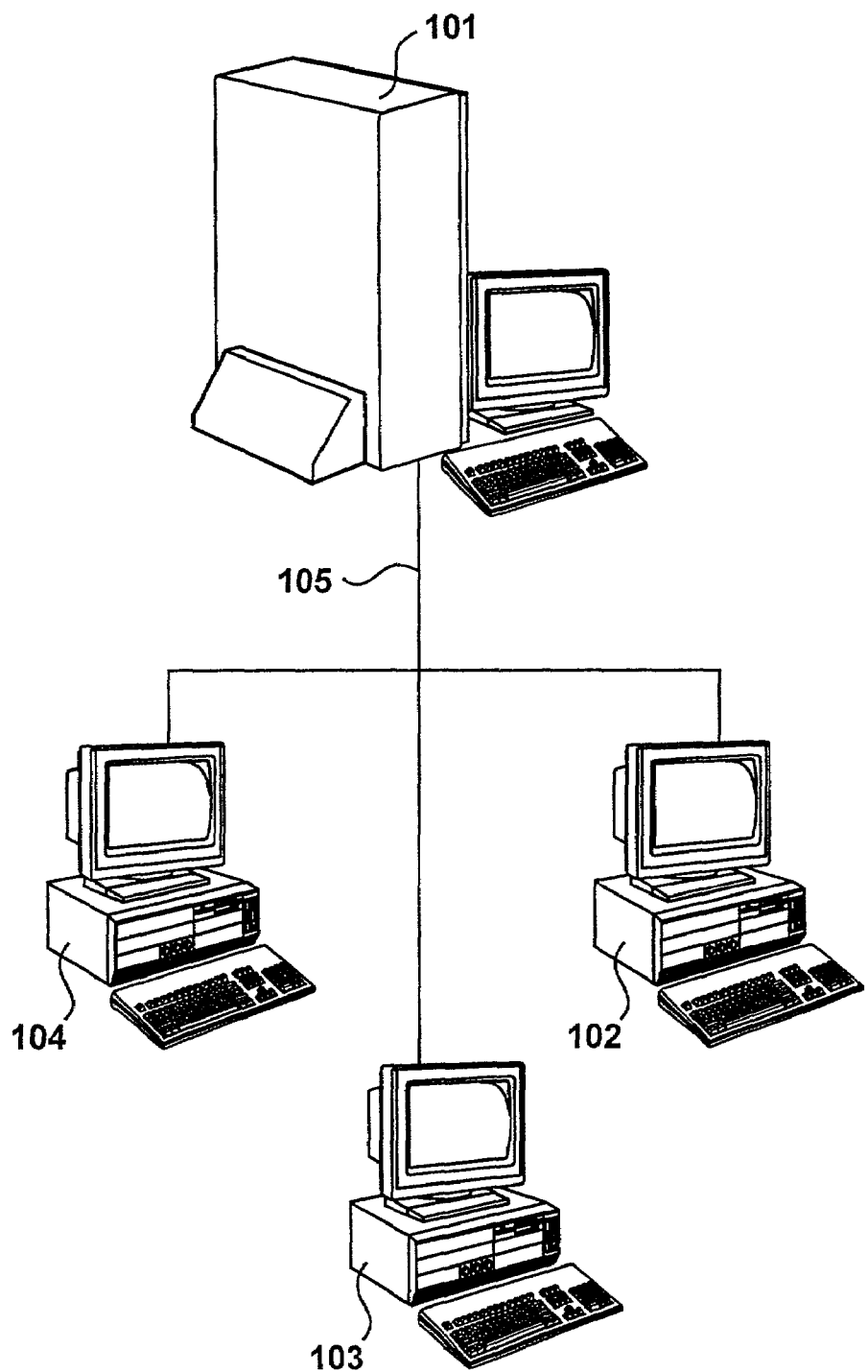
FIG. 1 provides a graphical representation of a network of computer systems, including one database server.

An environment for connecting multiple clients to whom data stored in a database will be distributed to is illustrated in FIG. 1.

Server 101 is connected to computer terminals, known to those skilled in the art as 'clients', or 'client systems' 102, 103, and 104 by means of a local area network (LAN) 105. Provided that appropriate data transfer applications, network protocols and access permissions have been set up, there is provided the scope for any which one of client systems 102 to 104 to access data stored on server 101.

FIG. 2

Figure 2:
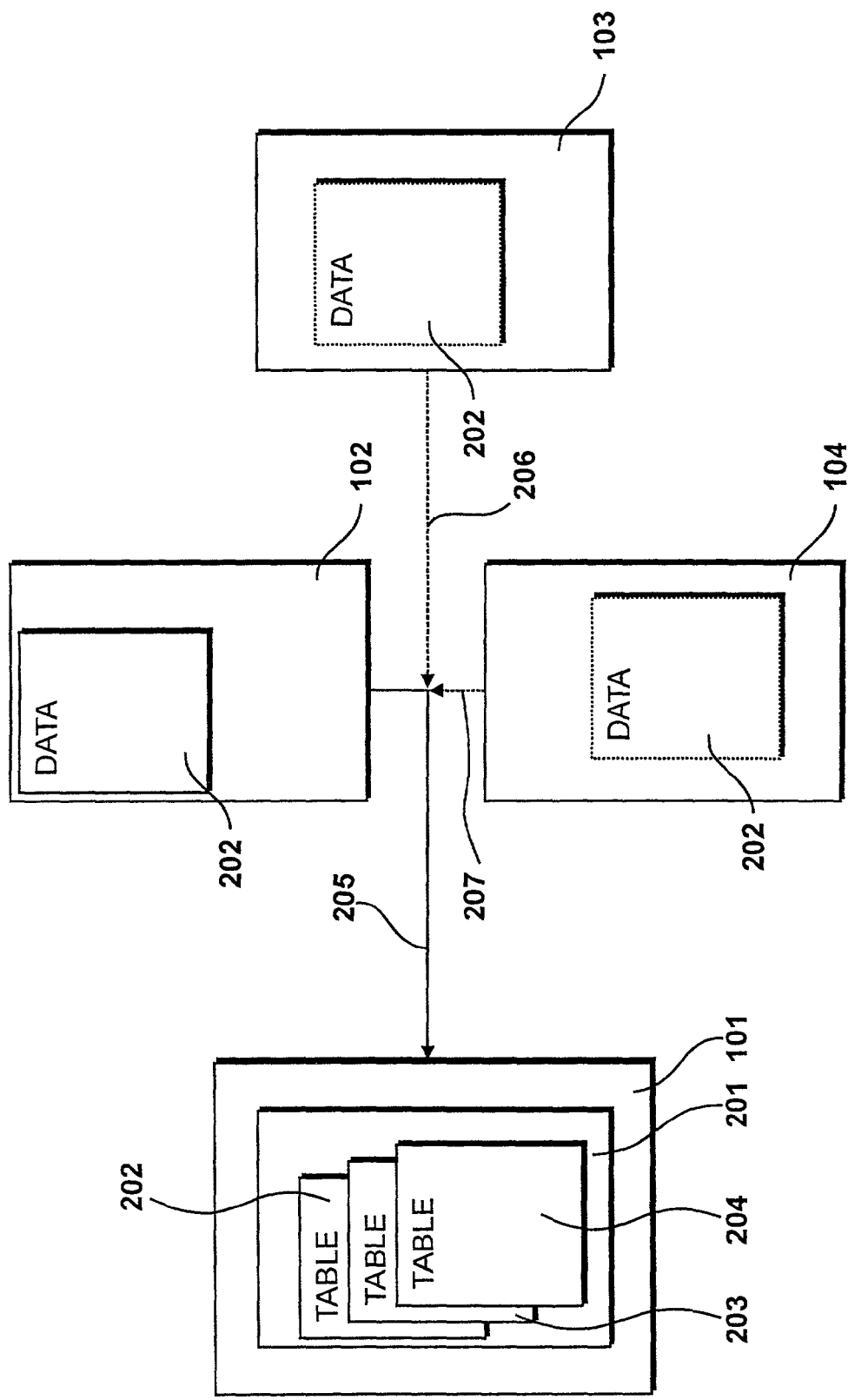
FIG. 2 graphically illustrates the distribution of the database data from the server to the networked user terminals shown in FIG. 1 according to the prior art.

Sharing data, or objects, stored in a database according to the known prior art is represented in FIG. 2.

Client systems 102, 103 and 104 can access data stored in the database 201 stored in server 101. In the example, database 201 is of the type known as a relational database. A relational database is used in the preferred embodiment, but it will be understood that the invention is equally applicable to object-oriented database or any other type of database which is transaction-oriented; that is, a database which uses transactions to ensure data integrity. A transaction is a series of one or more logically-related SQL statements that accomplish a task, such as a data update or query.

Thus, every SQL statement is part of a transaction and said SQL statements in a database application are executed within a transaction. The database treats the series of SQL statements as a unit so that all the changes brought about by the SQL statements are either made permanent or undone at the same time. Therefore, when one transaction ends, the next transaction automatically begins executing the SQL statements contained therein and so on and so forth.

As a relational database, database 201 includes a number of tables 202, 203 and 204 which contain data or objects to be subsequently distributed to clients systems over a network. Tables 202, 203 and 204 can be distributed to client system 102 via network 105 which, in the example, is a Local Area Network. In the example, client systems 102, 103 and 104 have all accessed table 202 and client system 102 modifies data within table 202, which results in a data update at server 101 by means of SQL statements contained within a transaction 205. According to the know prior art, whilst transaction 205 is being processed, client system 102 cannot modify and/or process data within table 202. Similarly, subsequently to client systems 103 and 104 also modifying data within table 202, neither of client systems 103 or 104 can update the data stored within table 202 in the database 201 by means of their respective transactions 206, 207 until the transaction 205 from said client system 102 is complete.

FIG. 3

Figure 3:
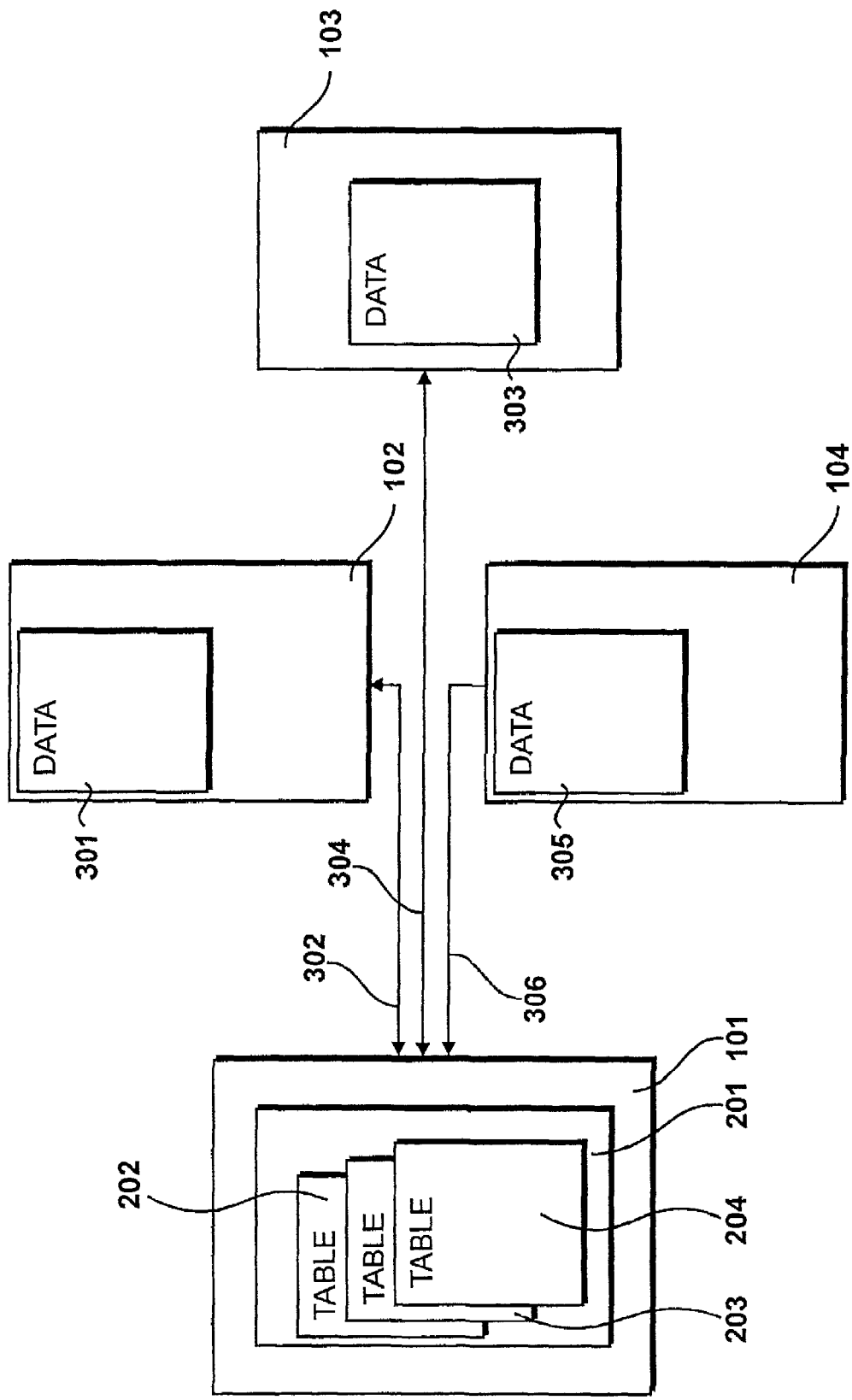
FIG. 3 graphically illustrates the distribution of the database data from the server to the networked user terminals shown in FIGS. 1 and 2 according to the invention.

According to the present invention, however, data or objects stored within tables 202, 203 or 204 in database 201 are understood as "permanent objects" and are distributed to client systems 102, 103 and 104 as copies of said "permanent objects", known as "transient objects", such that said transient objects can be permanently accessed and processed by client systems 102, 103 and 104 whilst their corresponding permanent objects within tables 202, 203 or 204 are being updated according to transaction requests 205, 206 and 207 previously issued. Said data updating according to the invention is represented in FIG. 3.

Upon obtaining access to table 202 in database 201, a transient copy 301 of the persistent data stored in table 202 is created at client system 102 which, according to technical effects of the present invention which will be detailed further below, enables the client system to access and amend the transient data contained within the transient copy 301. Upon performing a data update at client system 102, which is translated as a transaction containing a series of SQL statements, a transaction request is then created which is stored in a database request queue.

A database thread 302 then asynchronously updates the persistent data within table 202 corresponding to transient copy 301 according to the queued transaction request, allowing client system 102 to retain access to said persistent data within said table 202 before or during the said asynchronous update of said persistent data. Furthermore, if client system 103 requests access to data stored within table 202 whilst a transient copy 301 of said required data is cached at client system 102, transient copy 301 is invalidated at client system 102 and unloaded from said cache, and a transient copy 303 of the persistent data stored in table 202 is created at client system 103, whereby a transaction request is eventually created which is stored in a database request queue and a database thread 304 then asynchronously updates the persistent data within table 202 corresponding to transient copy 303 according to the queued transaction request and so on and so forth.

Likewise, upon obtaining access to table 203 in database 201, a transient copy 305 of the persistent data stored in table 203 is created at client system 104, whereby a transaction request is eventually created which is stored in a database request queue and a database thread 306 then asynchronously updates the persistent data within table 203 corresponding to transient copy 305 according to the queued transaction request.

The present invention therefore allows one or a plurality of client systems connected to a central database to access an identical set of persistent data or object stored in said central database and modify said identical set of persistent data or object regardless of the chronology of transactions processing. Given the processing speed with which the above mechanism is equipped, which is nevertheless dependent upon network latency for distributed data or processor speed for data accessed and processed within a single computer, users of client systems can constantly access data and perform updating operations on said data according to the invention, whereas the known prior art relies on exclusive locks between networked client or local application and data, which have to be released, i.e. the transaction must be completed, before any other networked client, or local application can access said data.

FIG. 4

Figure 4:
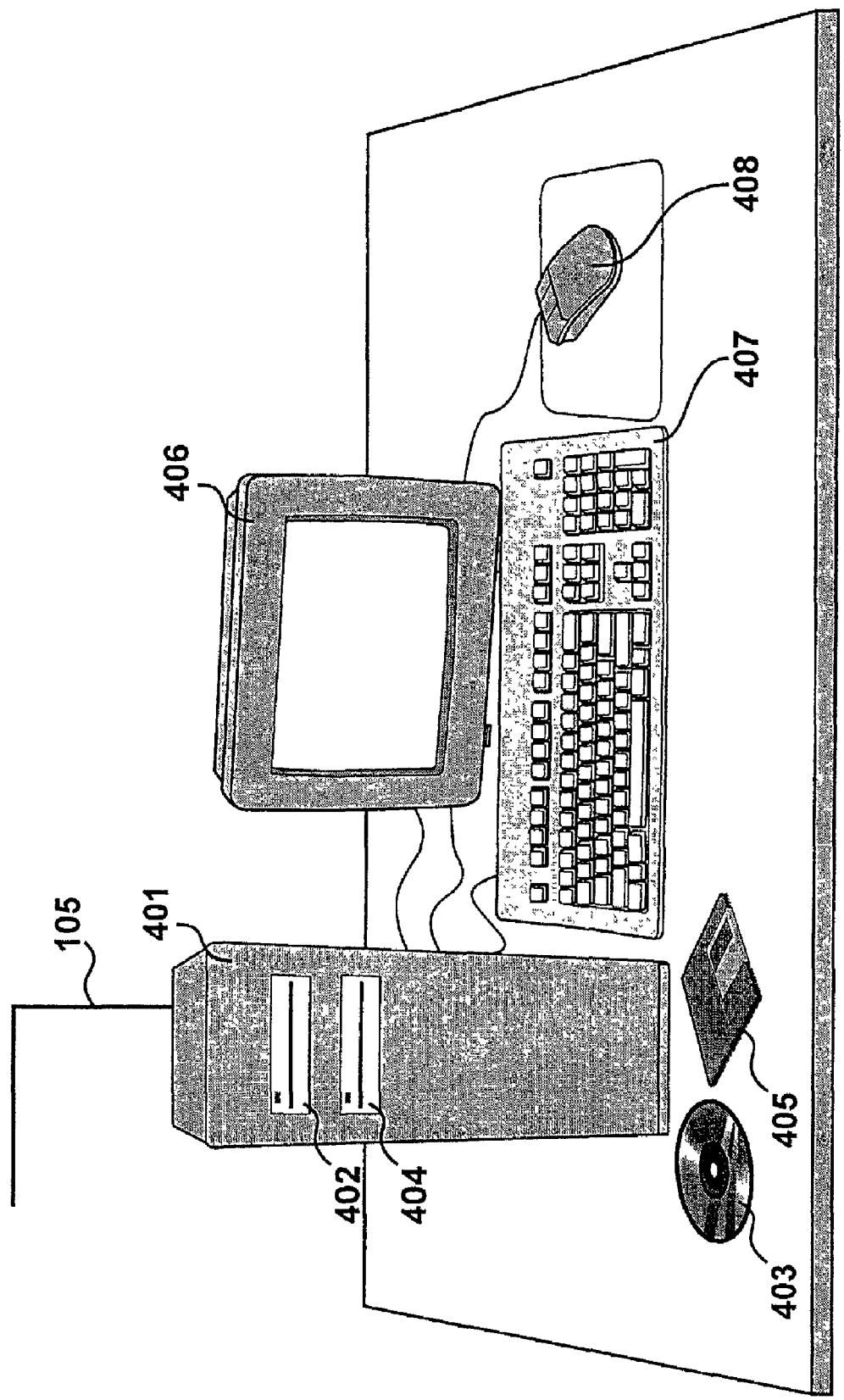
FIG. 4 provides a graphical representation of a typical computer system shown in FIGS. 1, 2 and 3, including a computer, monitor and input devices.

A typical client system, such as client system 102 shown in FIGS. 1, 2 and 3 is represented in FIG. 4.

Client system 102 includes a programmable computer 401 having a drive 402 for receiving CD-ROMs 403 and a drive 404 for receiving magnetic disks 405, such as floppy disks. Computer 101 may receive program instructions via an appropriate CD-ROM 403. Data entry into a database application, in order to update the database data or objects, may be carried out by means of manual input devices such as keyboard 407 and a mouse 408, or imported from magnetic disks 405. Query results processed from database transient data constitute output data which is displayed on a visual display unit 406 and may be written to magnetic disks 405. Input and Output data may also be transmitted and received over a network, such as local area network 105.

FIG. 5

Figure 5:
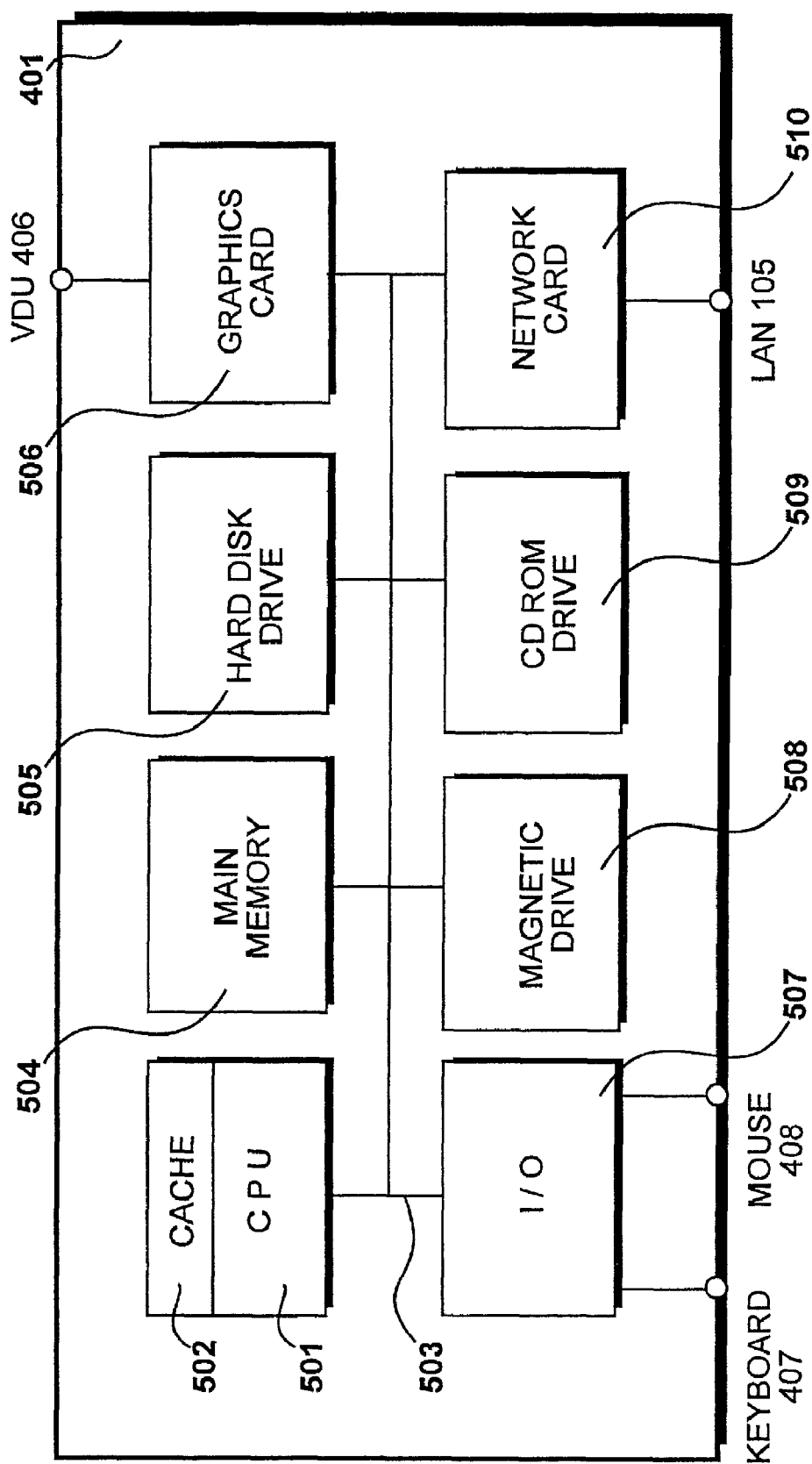
FIG. 5 provides a graphical representation of the main components of the computer shown in FIG. 2.

The components of programmable computer 401 shown in FIG. 4 are detailed in FIG. 5.

A central processing unit 501 fetches and executes instructions and manipulates data. Frequently accessed instructions and data are stored in a high speed cache memory 502. The central processing unit 501 is preferably a Pentium III™ central processing unit operating under instructions received from random access memory 504 via a system bus 503. Memory 504 comprises 128 megabytes of randomly accessible memory and executable programs which, along with data, are received via said bus 503 from a hard disk drive 505, which provides non-volatile bulk storage of instructions and data. A graphics card 506 receives graphics data from the CPU 501, along with graphics instructions. Preferably, the graphics card 506 includes substantial dedicated graphical processing capabilities, so that the CPU 501 is not burdened with computationally intensive tasks for which it is not optimised.

An input/output interface 507, a magnetic drive 508, CD-ROM drive 509 and network card 510 are also connected to bus 503. The I/O device 507 receives input commands from keyboard 407 and mouse 408. Magnetic drive 508 is primarily provided for the transfer of data, such as processed output data, and CD-ROM drive 509 is primarily provided for the loading of new executable instructions to the hard disk drive 505. Network card 510 provides connectivity to the LAN 105 via Ethernet or any other local network architecture known to those skilled in the art. The equipment shown in FIG. 5 constitutes a personal computer of fairly standard type, such as an IBM PC compatible or Apple Macintosh, which may be used either as a client system or distribution server.

FIG. 6

Figure 6:
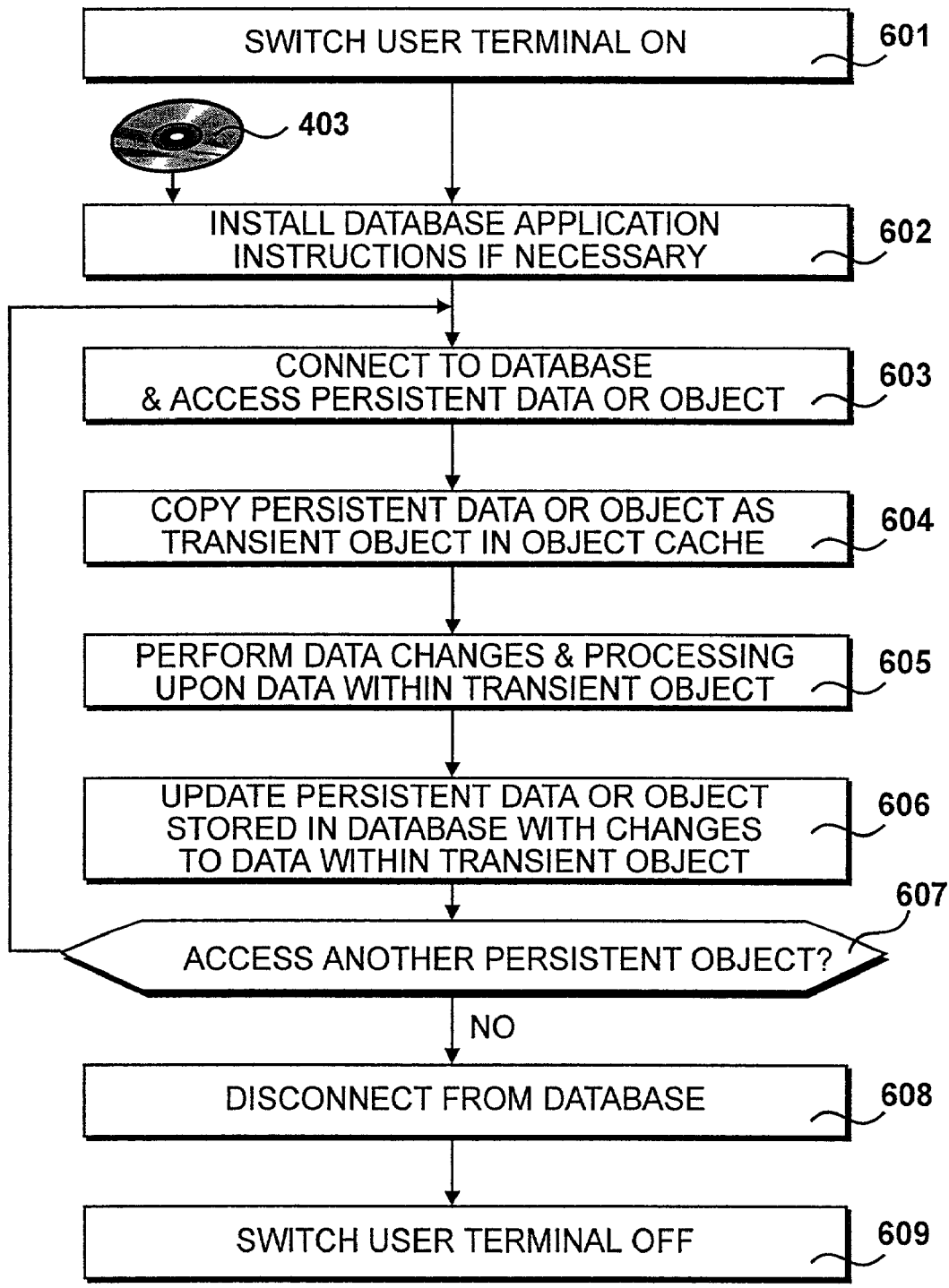
FIG. 6 summarises operations of the computer shown in FIG. 5.

Operations of the client system shown in FIG. 5 are summarised in FIG. 6.

At step 601 the client system is switched on, and the processing system 401 loads operating system instructions for initial operation. At step 602, if necessary, instructions for running the database application are installed onto the hard disk drive 505 from the CDROM drive 509, or possibly from a network such as network 105. In an alternative embodiment, the database is local and stored within client system 102, the data of which is to be shared by a one or a plurality of applications. In the preferred embodiment however, the database is remote. Thus, at step 603, the database application connects to database 201 stored in server 101 over a network connection, such as network 105.

Data or an object required by the user of client system 102 for processing and/or amendment and subsequent updating is accessed within database 201, and copied as a transient object at step 604. Data processing and/or amending is performed at step 605. This includes data modifying by means of input devices 408, 409, local data updating by means of magnetic medium 405 or simply data querying and thus processing by means of the database application. Upon executing data amendments at step 605, the database application according to the invention queues the corresponding database transaction request which the database thread will retrieve and conduct asynchronously at the next step 606. At said next step 606, the persistent data or object stored in database 201 is updated with the modifications implemented at step 605, i.e. the database transaction is executed by the database thread. A question is then asked at step 607 as to whether another persistent object needs to be accessed, at which point—if answered positively—control is returned to step 603. Steps 603 to 607 may be repeated indefinitely by the client system in relation with a same or different data set accessed within database 201. Alternatively, the question asked at step 607 is answered negatively so that the database application session is eventually terminated and the client system disconnects from the database 201 at step 608. At step 609, the client system is eventually closed down and switched off.

FIG. 7

Figure 7:
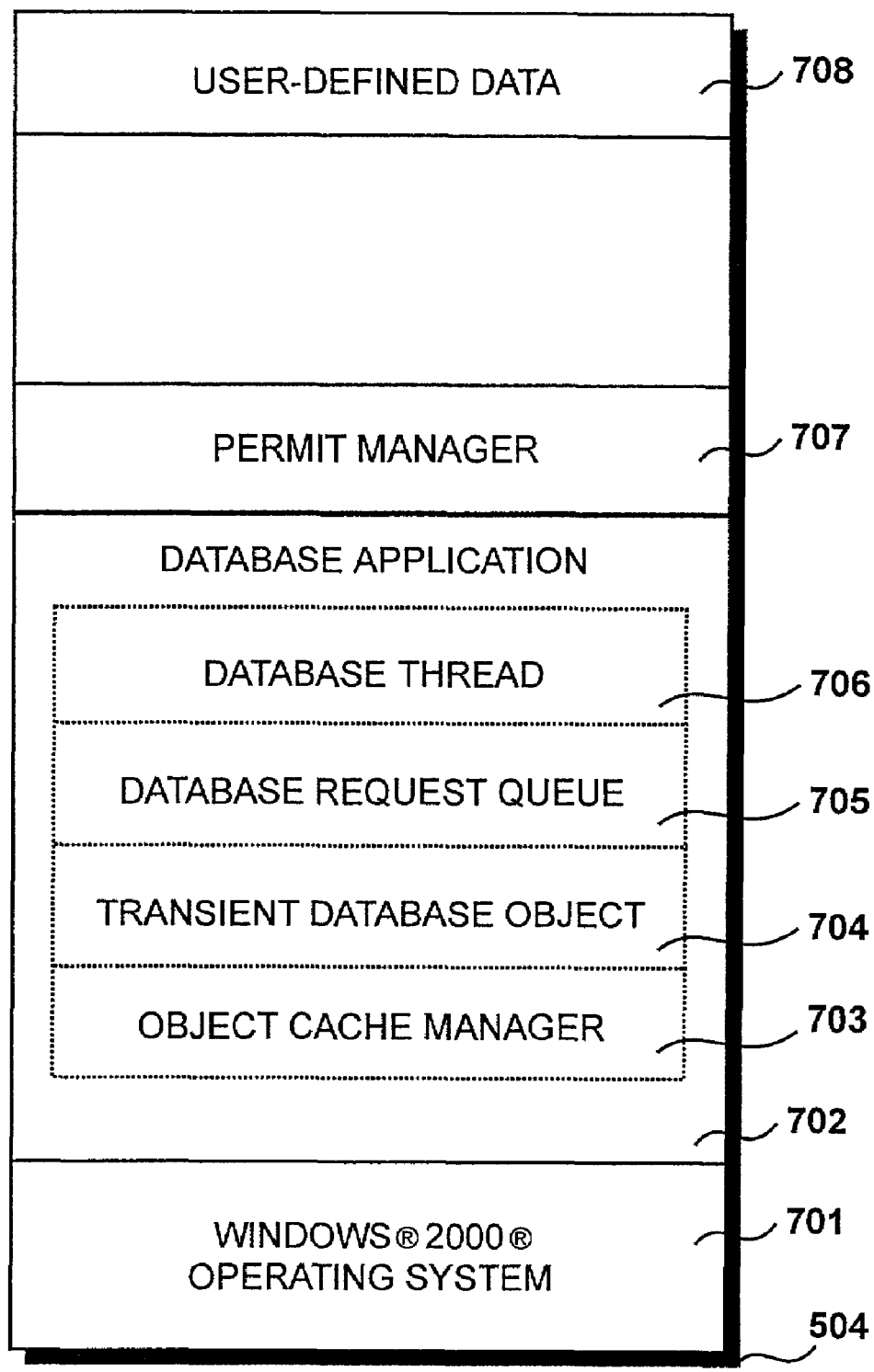
FIG. 7 provides a graphical representation of the contents of the main memory of the computer shown in FIG. 5 when using the database application according to the invention.

The arrangement of program instructions and data stored within memory 504, upon completing the loading of the database application instructions into memory 504 at step 602 and proceeding through to step 607, is summarised in FIG. 7.

An operating system such as Windows® 2000® is shown at 701. This provides common functionality shared between all applications operating on the computer 401, such as disk drive access, file handling and window-based graphical user interfacing. It also includes instructions for an Internet browser, a file browser and other items that are usually present but inactive on the user's graphical desktop. The database application 702 comprises the program steps required by the CPU 501 to generate, act upon and manage the transient copies 301, 303, 305 of persistent object or data stored in tables 202, 203, 204 of database 201. Said database application 702 thus includes an object cache manager (OCM) 703, one or a plurality of transient database object 704, a database request queue 705 and a database thread 706.

The function of the OCM 703 is to manage the transient object cache, which is the portion of main memory 504 dedicated to store transient objects 704. When a persistent object is accessed within database 201 as at step 603, the OCM 703 determines if its respective transient copy 704 already exists in the object cache and, if not, requests permission to access said persistent object from Permit Manager 707 in order to create a corresponding transient object 704.

The database request queue 705 is a buffer which sequentially stores the SQL statements issued by the database application, i.e. the transactions, and said transactions are performed by a database thread 706 of the database application running on a low priority, allowing other higher-priority threads, for instance from the application engine, to access and modify the transient object in the transient cache without having to wait for the database update.

The Permit Manager 707 manages permissions to access persistent object in database 201 between distinct clients or applications by alternately granting and revoking access to persistent object such that only one process at any one time accesses said persistent object to create a respective transient object, and the previously-existing transient object of said persistent object is unloaded from its respective transient object cache. Main memory 504 finally includes user-defined files 708.

FIG. 8

Figure 8:
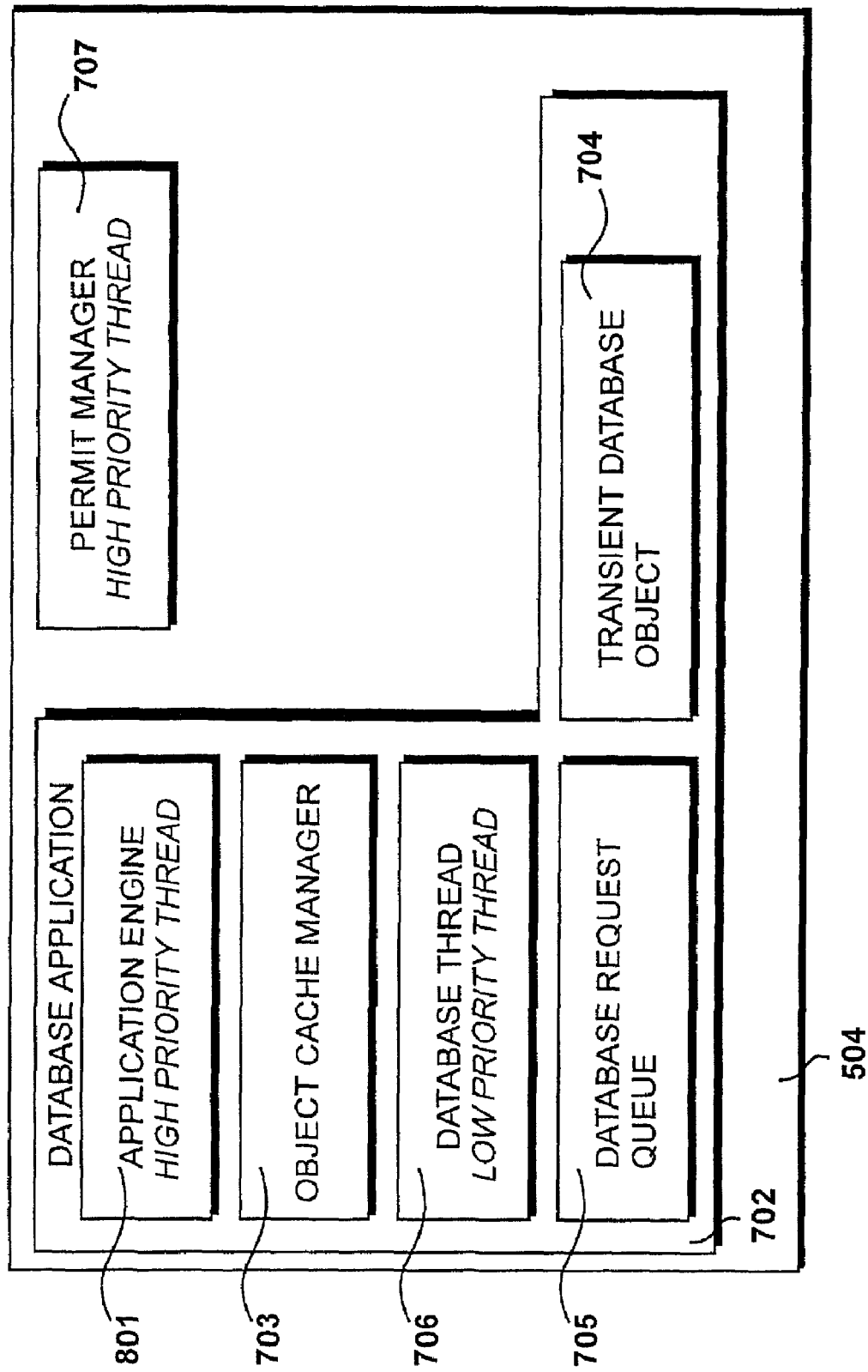
FIG. 8 provides a graphical representation of the main processes shown in FIG. 7 as concurrently processed by the computer processing unit shown in FIG. 5, including an object cache manager, a database thread and a Permit Manager.

In order to process or amend data within the transient object 705 and subsequently update the corresponding persistent data stored in database 201, a plurality of applications are concurrently processed by CPU 501, and are illustrated in FIG. 8.

The application engine 801 constitutes the main portion of the database application 702 and comprises executable code to logically manage, relate, process and display data within the transient object 704 and generally includes data-processing algorithms which are known to those skilled in the art. As this portion constitutes the backbone of the database application, its corresponding threads are given a high priority in terms of processor usage within each processing cycle.

The primary function of the OCM 703 is to authorise the application engine 801 to update the transient object 704 in order to ensure that the integrity of said transient object 704 is maintained at all times. It therefore comprises executable code to also logically manage data within the transient object 704. Subsequently to giving said authorisation, the OCM 703 queues the corresponding database transaction requests in database request queue 705. As such, the processor instructions generated by the OCM 703 are also given a high priority in terms of processor usage within each processing cycle.

As previously detailed, when a persistent object is accessed by the application engine 801 of database application 702 within database 201, the OCM 703 determines if its respective transient object 704 already exists in the object cache and, if not, requests permission to access said persistent object from Permit Manager 707 in order to create said transient object 704. Consequently, the processor instructions generated by the Permit Manager 707 are also given a high priority in terms of processor usage within each processing cycle, as although the functionality of both the OCM 703 and the Permit Manager 707 are minimal compared to that of the engine 801, they must nevertheless jointly ensure that a transient object exists within the transient object cache as fast as possible when the user wants to access the corresponding persistent data, and are therefore time-critical.

The database thread 706 is issued by the database application and used to retrieve the transactions issued from the database engine 801, subsequently queued in the database request queue 705 by means of the OCM 703, and then carry out said transactions asynchronously, i.e. lately update the persistent objects stored in the central database 201 with the local changes applied to their related transient objects 704. This thread of the application 702 is given a fairly low priority as it is not time-critical.

FIG. 9

Figure 9:
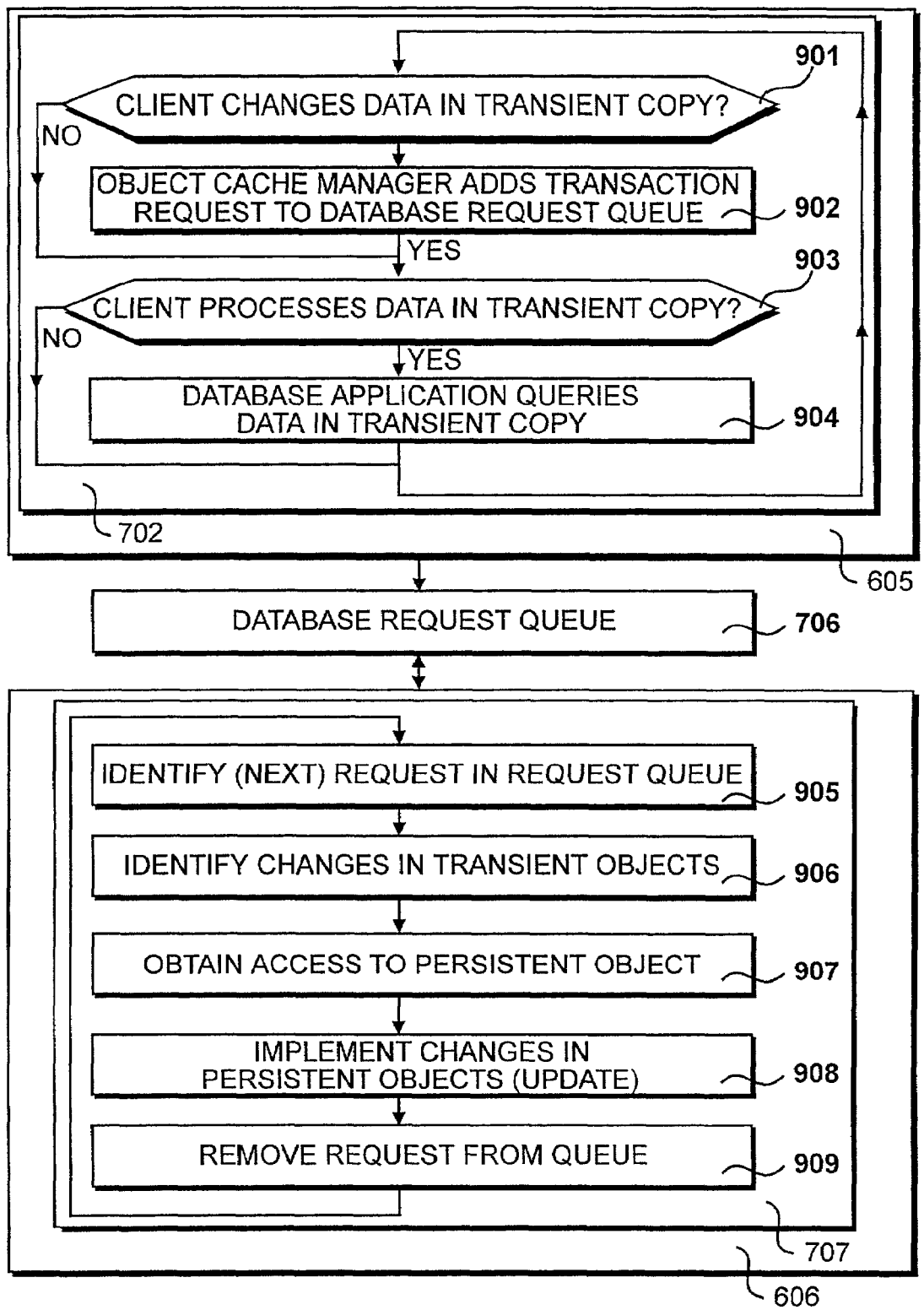
FIG. 9 represents the invention and summarises operations concurrently performed by the three applications within the database application shown in FIG. 8.

Computer-readable instructions from application engine 801, from the OCM 703, from the Permit Manager 707 and from database thread 706 are simultaneously processed. Operations concurrently performed by said instructions, respectively steps 605 and 606 of the present invention, are summarised in FIG. 9.

A question is asked at step 901 as to whether a client system user amends data within transient object 704 by means of the application engine 801. If the question is answered positively, the OCM 703 adds a transaction request to the database request queue 705 at step 902. Alternatively, a second question is asked at step 903 as to whether a client system user processes data within transient object 704 by means of the application engine 801, for instance in the case of a data query. If answered positively, then the database engine 801 processes the data contained within transient object 704 at step 904. Alternatively, control is then returned to step 901.

However, and in accordance with the prioritisation explained thereabove, if the question asked at step 901 is answered positively and a transaction request is added to the database request queue 705 at step 902, then database thread 706 identifies the next sequential transaction request within said queue 705 at step 905, then identifies the amendments made to the data within transient object 704 at step 906. Database thread 706 subsequently obtains access to the persistent object 202 within database 201 with the Permit Manager 707 at step 907 according to the same mechanism as at step 603, and carries out the transaction at step 908 which, in the preferred embodiment, is a data update. Once the transaction, i.e. data update is completed at step 908, the database thread 706 subsequently removes the transaction request from the database request queue 705 at step 909.

The fact that the OCM 703 adds a transaction request to the database request queue 705 at step 902, rather than allow the database application 702 to carry out the transaction with the central database 201 immediately is a clear advantage over techniques from the known prior art.

The database thread allows slow updates to take place. At any point during the execution of steps 905 through to 909, steps 901 through to 904 retain processing priority. Thus, whereas in the known art such local data amendments would have to update the central database 201 by way of a transaction which must be completed before the data being updated can be distributed to other nodes of a network or shared by any application at the same node, said updates are queued according to the invention, so that a background asynchronous database update may take place and enable the foreground data amendment process to continue regardless.

The asynchronicity of the database update according to the invention results from the low-priority conferred to the database thread 706, the integrity of the transactions from which is preserved by the interaction between OCM 703 and Permit Manager 707. OCM 703 alternatively loads and unloads transient copies of persistent objects upon being instructed to do so by the application engine 801 and the Permit Manager 707 respectively. In effect, the OCM 703 of local database application 702 requires access to persistent object in table 202 and the Permit Manager 707 subsequently revokes the existing permit to access said persistent object in table 202 of another local application or remote node at the time of the request, such that the OCM 703 obtains access to said persistent object 202.

Alternatively, another local application requires access to persistent object in table 202. The Permit Manager 707 subsequently revokes the permit of OCM 703 within main memory 504 of client system 102 to access persistent object in table 202, and orders OCM 703 to unload its current transient copy. As the database thread is already performing a persistent object update from transactions queued in database request queue 706, it does not require transient object 705 to remain at client system 102.

FIG. 10

Figure 10:
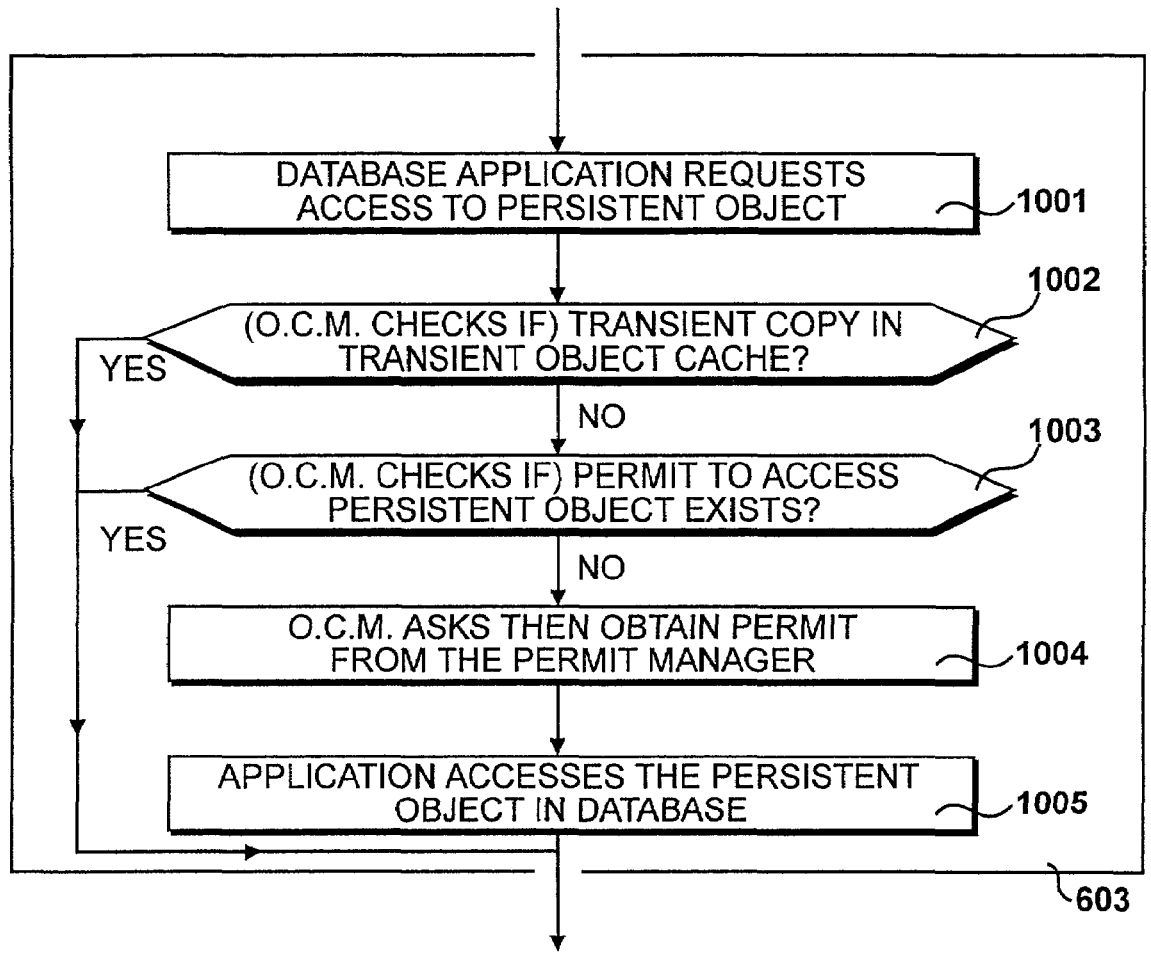
FIG. 10 summarises operations of the database application for accessing a persistent object according to operations shown in FIG. 9.

The object cache manager executes the above procedural steps at step 603, which are summarised in FIG. 10.

In order to access persistent data in table 202 and create a transient object 705 therefrom, the database application 702 initially requests access to said transient object at step 1001. The OCM 703 thus initially checks if a transient object 704 of the required persistent object 202 already exists in the transient object cache within main memory 504 at step 1002. If such a transient object already exists, then control is directed to step 604. Alternatively, control is directed to step 1003, whereby the OCM 703 next checks if it is already permitted to access the required persistent object 202. If such a permission is already obtained, then control is again directed to step 604. Alternatively, control is directed to step 1004, whereby the OCM 703 requests and subsequently obtains said permit to access from the Permit Manager 707. Upon obtaining said permit at step 1004, the OCM 703 accesses the persistent object 202 at step 1005.

FIG. 11

Figure 11:
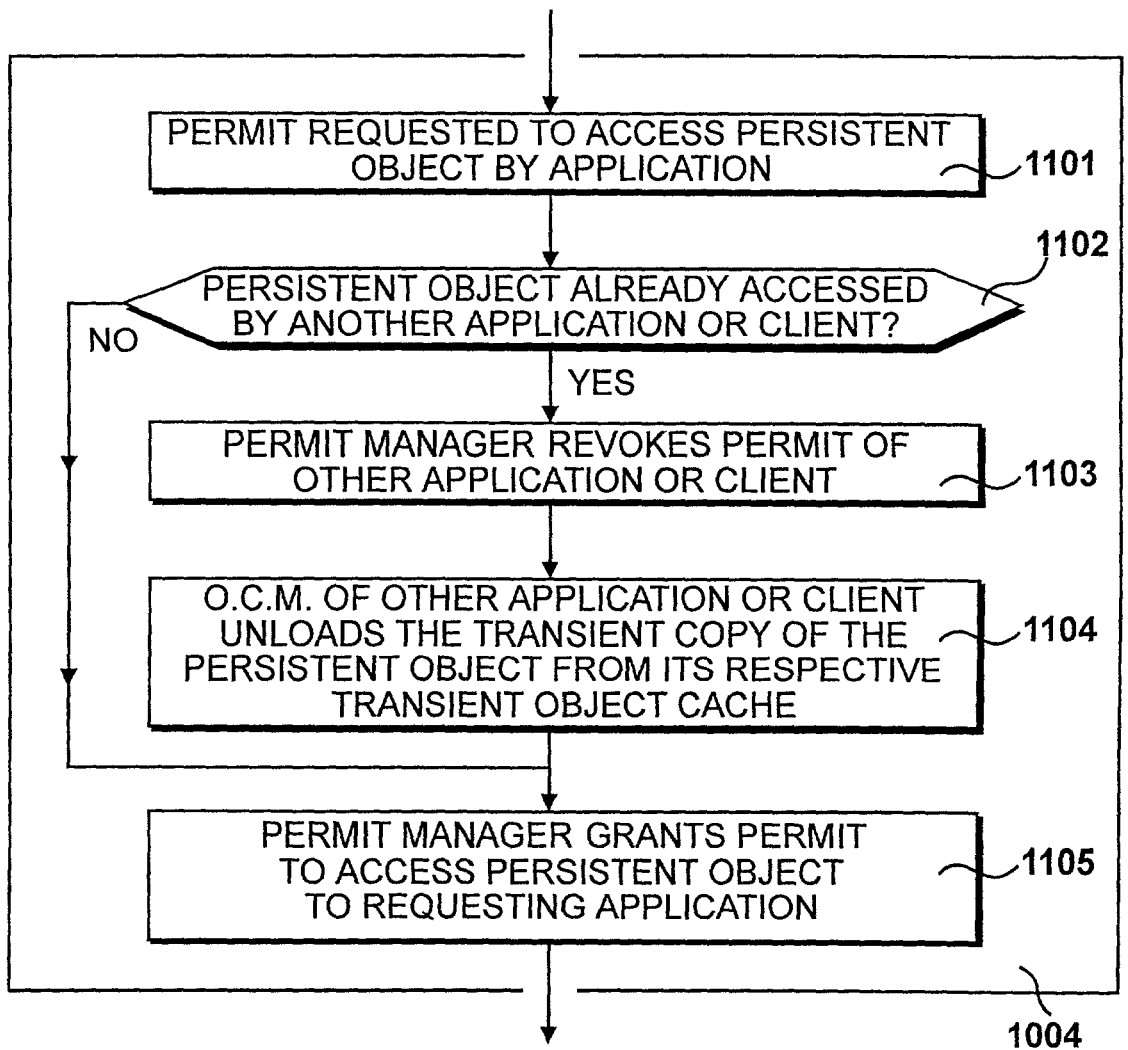
FIG. 11 summarises operations performed by the Permit Manager to grant access to a persistent object according to operations shown in FIG. 10.

The exclusivity of persistent object transactions, which is paramount to the integrity of data stored in any database operating with transactions, is achieved with operations performed at step 1004, whereby the Permit Manager 707 manages permissions to access persistent object in database 201 between distinct clients or applications by alternately granting and revoking access to persistent object such that only one process at any one time accesses said persistent object to create a respective transient object, and the previously-existing transient object of said persistent object is unloaded from its respective transient object cache. The procedural steps of said operations are summarised in FIG. 11.

The Permit Manager 707 initially receives a request for permission to access a persistent object stored within database 201 from OCM 703 at step 1101. At step 1102, the Permit Manager determines whether another process or client system already has permit to access the required persistent object. If this determination is negative, then control is directed to the last procedural step 1105, which will be further detailed below. Alternatively, if another process or client system already has permit to access the required persistent object, then at step 1103 the Permit Manager revokes said permit to access the required persistent object of the other process or client system, which has for direct effect to instruct the cache manager in charge of the existing transient object, used by said other process or client system, to unload said transient object from its transient object cache at step 1104. Upon said OCM 703 performing said unload function and the Permit Manager 707 receiving confirmation to this effect, then at step 1105 the Permit Manager 707 grants permit to the requesting OCM 703 to access the required persistent object 202, whereby a transient copy 704 may now be created by said requesting OCM. In the preferred embodiment, this procedure is known as 'cache invalidation'.

The present invention therefore provides an improved method of updating data or objects stored in a database by means of a database thread implemented in a database-dependent application or database tool stored in the main memory of a computer, such that an object cache manager allows said database-dependent application or database tool to modify a cached version of a transient object and to queue corresponding database processing commands, which will then be served by said database thread to update the persistent data corresponding to said transient object and stored in the central database. Whilst said update takes place, i.e. SQL statements are processed at the database server, said terminal user can still consult and further amend or query said persistent data, thereby resulting in an improved productivity of said terminal user.

The invention claimed is:

1. An apparatus comprising visual display means, processing means, storage means and memory means; wherein said memory means is configured to store program instructions for updating data in a central database, having a persistent copy of an object that control processing steps, wherein:
   a database application makes modifications, in cache, to a transient copy of said object;
   a database thread generates database transaction requests for updating the persistent copy of the object in the central database to reflect said modifications to the transient copy; and
   said database transaction requests are processed, in a database transaction request queue, at a lower priority than said modifications to the transient copy, wherein when the transient copy of the object in one client is accessed, any previously existing transient copy of the object in another client is unloaded from the cache of the other client.

2. An apparatus according to claim 1, wherein said central database is stored locally or distributed over a network to remote nodes.

3. An apparatus according to claim 1, wherein said central database is transaction-oriented.

4. An apparatus according to claim 1, wherein said database thread includes sin object cache manager.

5. An apparatus to claim 4, wherein said object cache manager creates said transient copy in a transient object cache according to permission from a Permit Manager.

6. An apparatus according to claim 1, wherein said modifications to the transient copy of the object comprises an amendment implemented locally or remotely on said transient copy.

7. An apparatus according to claim 1, wherein transient copy is stored in the main memory of a local or remote database client system or a plurality thereof.

8. An apparatus according to claim 1, wherein said database thread is a low priority thread.

9. An apparatus according to claim 1, wherein said database thread identifies and then executes said database transaction requests asynchronously.

10. An apparatus according to claim 1, wherein said queued database transactions requests are removed from said database transaction request queue once the said database transaction they respectively define is accomplished.

11. A method of updating data in a central database in a computer implemented system comprising:
    a database application melting modifications, in cache, to a transient copy of an object having a persistent copy in the central database, that controls processing steps;
    a database thread generating transaction requests for updating a persistent copy of the object in the central database to reflect said modifications to the transient copy; and
    processing said database transaction requests, in a database transaction request queue, at a lower priority than said modifications to the transient copy, wherein when the transient copy of the object in one client is accessed, any previously existing transient copy of the object in another client is unloaded from transient object cache of the other client.

12. A method according to claim 11, wherein said central database is stored locally or distributed over a network to remote nodes.

13. A method according to claim 11, wherein said central database is transaction-oriented.

14. A method according to claim 11, wherein said database thread includes an object cache manager.

15. A method according to claim 14, wherein said object cache manager creates said transient copy in a transient object cache according to permission from a Permit Manager.

16. A method according to claim 11, wherein said modifications to the transient copy of said object comprises an amendment implemented locally or remotely on said transient copy.

17. A method according to claim 11, wherein transient copy is stored in the main memory of a local or remote database client system or a plurality thereof.

18. A method according to claim 11, wherein said database thread is a low priority thread.

19. A method according to claim 11, wherein said database thread identifies and then executes said database transactions requests asynchronously.

20. A method according to claim 11, wherein said queued database transaction requests are removed from said database transaction request queue once the said database transaction they respectively define is accomplished.

21. A computer-readable medium having computer-readable instructions executable by a computer such that, when executing said instructions, a computer will perform the steps of:
    making modifications, in cache, to a transient copy of an object that controls processing steps;
    generating database transaction requests for updating a persistent copy of the object, in a central database, to reflect said modifications to the transient copy; and
    processing said database transaction requests, in a database transaction request queue, at a lower priority than said modifications to the transient copy, wherein when the transient copy of the object in one client is accessed, any previously existing transient copy of the object in another client is unloaded from transient object cache of the other client.

* * * * *